United States Patent [19]
Lechner

[11] Patent Number: 5,746,599
[45] Date of Patent: May 5, 1998

[54] MODULAR VIDEO DISPLAY SYSTEM

[75] Inventor: Robert J. Lechner, St. Charles County, Mo.

[73] Assignee: McDonnell Douglas Corporation, St. Louis, Mo.

[21] Appl. No.: 407,138

[22] Filed: Mar. 20, 1995

Related U.S. Application Data

[63] Continuation-in-part of Ser. No. 331,418, Oct. 31, 1994, Pat. No. 5,487,665.

[51] Int. Cl.⁶ ............................ G09B 9/08; G09B 19/16
[52] U.S. Cl. ............................ 434/44; 434/38; 348/123; 359/460; 353/79
[58] Field of Search .......................... 434/38, 43, 44, 434/29, 30, 55, 307 R, 308; 345/8, 9; 348/36, 61, 117, 121, 123; 352/85, 69; 353/630, 30, 94, 79; 472/130; 359/481, 454, 460

[56] References Cited

U.S. PATENT DOCUMENTS

| | | |
|---|---|---|
| 3,514,871 | 6/1970 | Tucker .................................. 434/44 |
| 3,557,470 | 1/1971 | Emerick et al. ....................... 434/44 |
| 4,127,322 | 11/1978 | Jacobson et al. . |
| 4,246,605 | 1/1981 | La Russa . |
| 4,295,159 | 10/1981 | Carollo et al. . |
| 4,352,664 | 10/1982 | Morrison et al. . |
| 4,473,355 | 9/1984 | Pongratz .............................. 434/44 |
| 4,599,645 | 7/1986 | Brown et al. ..................... 434/38 X |
| 4,634,384 | 1/1987 | Neves et al. . |
| 4,656,506 | 4/1987 | Ritchey ............................... 348/39 |
| 4,775,859 | 10/1988 | Starkey, IV et al. . |
| 5,137,450 | 8/1992 | Thomas ............................ 434/38 X |
| 5,242,306 | 9/1993 | Fisher . |
| 5,264,881 | 11/1993 | Brooke . |
| 5,320,534 | 6/1994 | Thomas . |
| 5,320,538 | 6/1994 | Baum . |
| 5,487,665 | 1/1996 | Lechner et al. . |

FOREIGN PATENT DOCUMENTS

| | | |
|---|---|---|
| 0514045A1 | 11/1992 | European Pat. Off. . |
| 2 680 266 | 2/1993 | France .................................. 434/38 |
| 4204842 | 7/1992 | Japan . |

OTHER PUBLICATIONS

International Search Report for PCT/US96/11407, filed Jul. 8, 1996.

*Primary Examiner*—Joe Cheng
*Attorney, Agent, or Firm*—The Bell Seltzer Intellectual Property Law Group Of Alston & Bird, LLP

[57] ABSTRACT

A visual display system, such as a flight simulation system, includes a number of display screens and a number of associated video projectors which project predetermined video images on the display screens in response to control signals provided by an operator. In one embodiment, the display screens are circumscribed by an imaginary sphere having a predetermined radius and centered about the design eye of the visual display system. The design eye is generally positioned in a predetermined fixed relation to the operator such that the distortion of the displayed video image is reduced. In another embodiment, the video projectors are mounted in a linear side-by-side relationship on a rear side of the display screens, thereby reducing the overall size of the visual display system. The visual display system also includes image redirection means, such as fold mirrors, to redirect the video images projected by the aligned video projectors so as to provide the video images to the respective display screens in a direction perpendicular to the planar surface of each display screen. In addition, adjacent display screens can be attached by a pair of rearwardly extending tabs which are positioned so as to not mask the projected video images. At least one of the pair of tabs is opaque such that the projected video images will not pass between the adjacent display screens. Thus, at least the portion of the video image displayed along the edges of the adjacent display screens is clarified.

6 Claims, 7 Drawing Sheets

MODULAR VIDEO DISPLAY SYSTEM

RELATED APPLICATION

This application is a continuation-in-part of U.S. patent application Ser. No. 08/331,418 filed Oct. 31, 1994, now U.S. Pat. No. 5,487,665, the contents of which are expressly incorporated in their entirety herein.

FIELD OF THE INVENTION

The present invention relates generally to visual display systems and, more particularly, to visual simulation systems, including flight simulation systems.

BACKGROUND OF THE INVENTION

Visual display systems, such as flight simulation systems, are commonly employed to train military, commercial and other personnel. Conventional visual display systems include one or more screens onto which a video image is projected by one or more projectors, such as light valve projectors or cathode ray tubes (CRTs). An operator views the projected video images and reacts in response thereto. Accordingly, the operator of the visual display system is also generally provided with a control panel and, in some instances, a joystick for providing input to the visual display system in response to the displayed video image. Thus, the operator can simulate the flight of an aircraft, for example, and can respond to the environment as depicted by the visual display.

In conventional flight simulation systems in which a full color video image is displayed, one projector, generally termed an RGB projector, is typically associated with each screen of the visual display system to project the red, green and blue color components of the video image on the associated screen. A typical RGB projector produces video images, each of which consist of a predetermined number of video lines, and each line of which consists of a predetermined number of picture elements, or pixels. For example, a conventional projector produces 1,024 video lines, each consisting of 1,280 pixels. In addition, the video images are produced at a predetermined frequency or frame rate, such as 30 or 60 hertz.

Conventional flight simulation systems include a variety of types and shapes of display screens on which the video image is displayed. For example, some flight simulation systems include a single flat display screen having a field of view which is generally positioned in front of the operator. These flight simulation systems generally require only a single RGB projector for projecting the video images upon the display screen. Thus, the design of flight simulation systems which include a single flat display screen is less complex than other types of flight simulation systems. However, the realism of such simulation systems is limited since the video images displayed on the single flat display screen generally do not accurately represent the out the window (OTW) view of the pilot of most aircraft who can also look laterally.

Another type of conventional flight simulation system which provides a more realistic visual image for the operator includes a spherically shaped dome structure on which the video image is projected. The operator is generally seated at a control station within the spherical dome such that the operator can view video images that are displayed in front of, beside of, above and, in some instances, behind the operator.

One exemplary flight simulation system which includes a partial dome having a generally spherical shape is disclosed in U.S. Pat. No. 4,634,384 which issued Jan. 6, 1987 to Fernando B. Neves et al. (hereinafter the "'384 patent"). As illustrated in the '384 patent, a spherical screen partially surrounds the operator. One or more display sources, such as Schlieren light valve projectors, are mounted above the operator on a front side of the screen for projecting the video images on the spherical display screen. The operator thereafter reacts to the displayed video images by actuating various controls to control the simulated flight of the aircraft.

While flight simulation systems which include spherical display screens provide a more realistic video image to the simulation operator, such flight simulation systems are generally physically large and complex. In addition, such flight simulation systems are generally both mechanically and electrically complex such that the flight simulation systems cannot be readily transported between locations in the field. Further, such flight simulation systems generally include a number of integrated display sources, such as light valve projectors or CRTs, which add to the complexity of the system.

SUMMARY OF THE INVENTION

In view of the foregoing background, it is therefore an object of the present invention to provide an improved visual display system.

It is also an object of the present invention to provide an improved flight simulation system.

It is a further object of the present invention to provide a modular flight simulation system which is relatively compact so as to be readily repositioned in the field.

These and other objects are provided, according to the present invention, by a visual display system, such as a flight simulation system, which displays a plurality of sequential video images on a plurality of display screens for an operator. In one embodiment, the plurality of display screens are positioned in a predetermined concave relationship so as to be circumscribed by an imaginary sphere having a predetermined radius and centered about the design eye of the flight simulation system. Thus, the relative distortion of displayed video images is reduced. In another embodiment, the flight simulation system includes a plurality of video projectors arranged in a linear side-by-side relationship on a rear side of the plurality of display screens such that the overall size of the flight simulation system is reduced. The flight simulation system of yet another embodiment includes first and second tabs, at least one of which is opaque, extending rearwardly from adjacent display screens for attaching the adjacent display screens so as to clarify at least the portion of the video image displayed along the edges of the adjacent display screens.

In a first embodiment, the flight simulation system includes video projection means, such as a plurality of video projectors, for projecting a predetermined video image on the plurality of display screens. The plurality of display screens of this embodiment generally includes a front screen, first and second opposed side screens and an upper screen. The flight simulation system also includes a control station for providing control signals in response to actuation of various controls by an operator. The actuation of the controls by the operator is typically based upon the predetermined video images which are displayed. In response to the control signals provided by the operator, a flight simulation controller controls the video image projected by the video projection means.

By positioning each of the plurality of display screens of the embodiment and, in particular, each of the corners of the plurality of display screens so as to be circumscribed by an imaginary sphere having a predetermined radius which is centered about the design eye of the flight simulation system, the distortion of the displayed video image is reduced. The design eye is generally positioned in a predetermined fixed relation to the viewing position of the operator.

In one embodiment, each of the first and second opposed side screens has a trapezoidal shape. Each trapezoidal side screen of this embodiment has a first edge, adjacent the front screen, and an opposed second edge. Preferably, the height of each side screen increases in an outward direction from the front screen such that the second edge of each side screen is longer than the first edge.

In this embodiment, the flight simulation system further includes image generation means for generating video signals representative of the predetermined video images. In particular, the video signals generated by the image generation means which are representative of video images to be displayed on the first and second trapezoidal side screens preferably represent video images having a trapezoidal shape corresponding to the trapezoidal shape of the first and second side screens.

The front screen of the flight simulation system generally has a first predetermined aspect ratio which defines the ratio of the width of the displayed video image to the height of the displayed video image. In addition, each side screen has a second predetermined aspect ratio. In one embodiment, the first predetermined aspect ratio is greater than one, while the second predetermined aspect ratio of each side screen is less than one. In a more specific embodiment, the first aspect ratio is the inverse of the second aspect ratio.

In another embodiment, the visual display system includes a visual display system support structure to which the plurality of display screens and the plurality of video projectors are mounted in a predetermined position. In particular, the plurality of video projectors are mounted in a linear side-by-side relationship on a rear side of the plurality of display screens such that the overall size of the visual display system is reduced. In order to properly display the predetermined video images on the display screens, the visual display system of this embodiment also includes image redirection means, such as fold mirrors, for redirecting the video image projected by at least two of the video projectors. Accordingly, the predetermined video images are provided to the respective display screens in a direction perpendicular to the planar surface of each respective display screen.

The visual display system of this embodiment can also include an upper screen. Preferably, the video projector which is adapted to project a predetermined video image on the upper screen is also positioned on the rear side of the plurality of display screens. Further, the video projector associated with the upper screen is preferably positioned above the video projector which is adapted to project a predetermined video image on the front screen.

The plurality of display screens can also include first and second rear side screens and a rear upper screen, the combination of which comprise a rear display module. In this embodiment, the first and second rear side screens and the rear upper screen are also circumscribed by the imaginary sphere centered about the design eye of the flight simulation system.

In one embodiment, the rear display module is movable from a rear position adjacent the plurality of video projectors which project the predetermined images upon the first and second rear side screens and the rear upper screen to a forward position adjacent the first and second side screens. In addition, an opaque covering can extend between the rear video projectors and the rear display module.

Adjacent display screens of the visual display system of the present invention are generally mounted in an abutting relationship along respective edges. In particular, the display screens are preferably mounted such that the first side of the display screens which the operator views is concave. Thus, the rear surface of each display screen is generally wider than the corresponding front surface so as to thereby define a rear edge portion along each respective edge which extends outwardly beyond the corresponding front surface.

In one embodiment, the visual display system also includes first and second tabs, such as first and second strips, bonded to the rear edge portions of adjacent display screens, such as with an optically transmissive adhesive. Each tab extends rearwardly from the rear side of a respective display screen such that the projected video image is not masked. The visual display system of this embodiment also includes attachment means for attaching the first and second tabs such that the adjacent display screens are thereby securely joined. In addition, at least one of the tabs is opaque such that the projected video image will not pass between the display screens. Thus, at least a portion of the video image displayed along the edges of the display screens is clarified.

In one embodiment, the first and second tabs extend rearwardly from the rear sides of the respective display screens to thereby define an edge plane. In addition, each display screen of this embodiment includes a planar display surface. Further, the respective display surfaces of adjacent display screens preferably intersect at a predetermined angle. The edge plane of one embodiment preferably bisects the predetermined angle defined by the intersection of the abutting display screens.

The visual display system of this embodiment is particularly effective with video projection means which projects a video image which expands during projection to fill the respective display surfaces of the display screens, thereby defining a video image envelope. In this embodiment, the first and second rearwardly extending tabs are preferably outside of the video image envelope such that the expanding video images are not masked.

Therefore, according to one embodiment of the visual display system of the present invention, the plurality of display screens can be positioned so as to be circumscribed by an imaginary sphere, thereby reducing the distortion of the displayed video image. In addition, the plurality of video projectors which provide the video images to the display screens can be arranged in a linear side-by-side relationship on the rear side of the display screens to reduce the overall size and to increase the modularity of the visual display system. Further, tabs can extend rearwardly from the edges of adjacent display screens so as to securely join adjacent display screens without masking the projected video image. The tabs also prevent the projected video images from passing between the adjacent display screens such that at least the portion of the video image displayed along the edges of the display screens is clarified.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
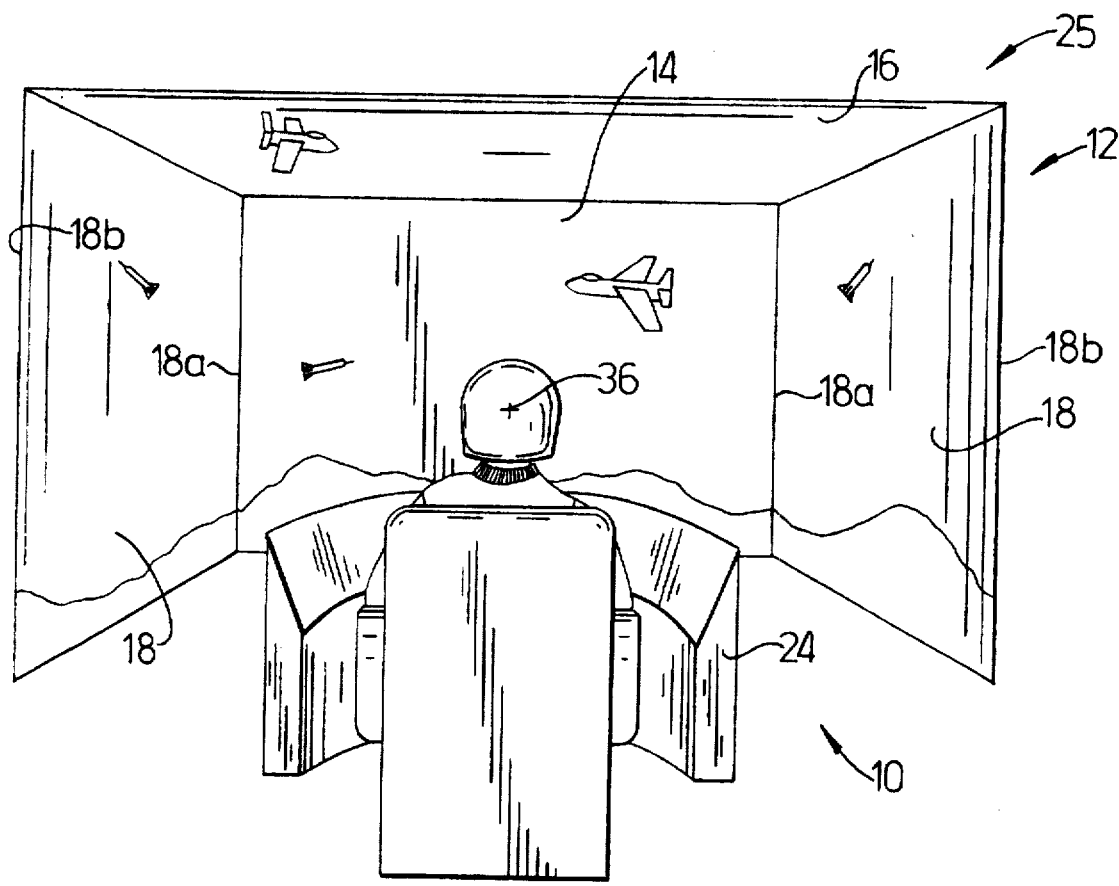
FIG. 1 is a perspective view illustrating a visual display system of the present invention which includes a front display screen, a pair of opposed side display screens and an upper display screen.

Referring now to FIG. 1, a visual display system 10 according to the present invention is illustrated. As illustrated, the visual display system can be a flight simulation system which is employed to train military, commercial or other personnel to fly aircraft and to appropriately respond to particular flight situations. However, the visual display system can also be employed to simulate other environments and to train other personnel for other operations without departing from the spirit and scope of the present invention.

As illustrated in FIG. 1, a visual display system 10, such as a flight simulation system, includes a plurality of display screens 12. For example, the visual display system can include an out-the-window flight simulation system such as the Visual Integrated Display System manufactured by McDonnell Douglas Corporation, the assignee of the present application. As illustrated, the flight simulation system can include a front screen 14 positioned in front of the operator and an upper screen 16 mounted adjacent to and above the front screen. As illustrated, the upper screen slopes upwardly in a direction from the front screen toward the operator. In addition, the flight simulation system generally includes first and second opposed side screens 18 adjacent to both the front screen and the upper screen and extending laterally beside the operator.

Figure 2:
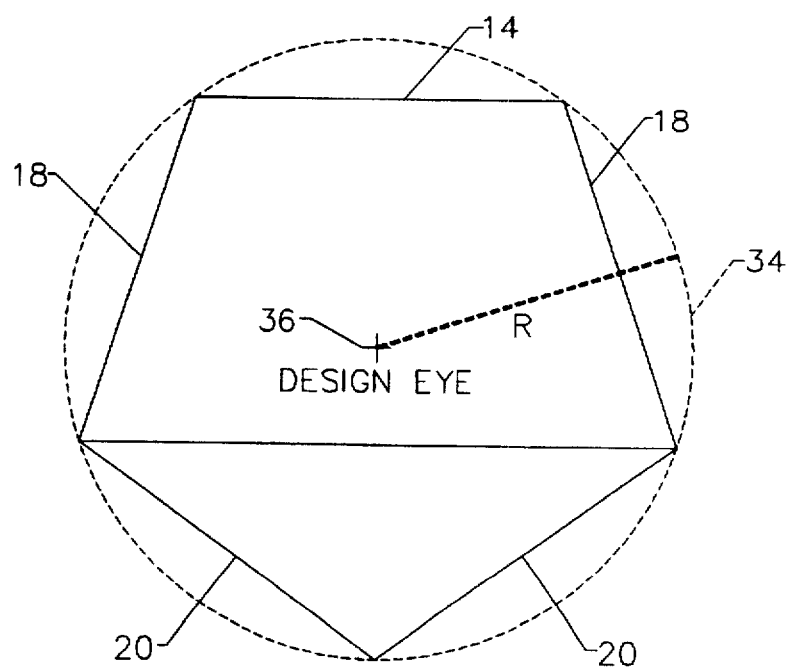
FIG. 2 is a schematic top view of the front screen, the first and second side screens and the first and second rear side screens of the visual display system of one embodiment of the present invention.
Figure 3:
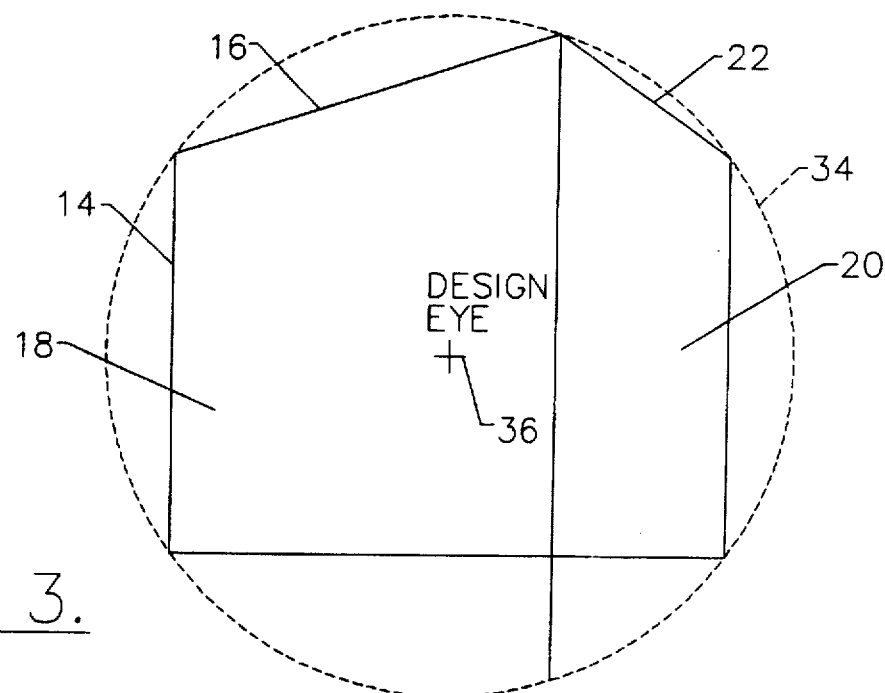
FIG. 3 is a schematic side view of the front screen, the upper screen and the rear screen of the visual display system of one embodiment of the present invention.
Figure 6:
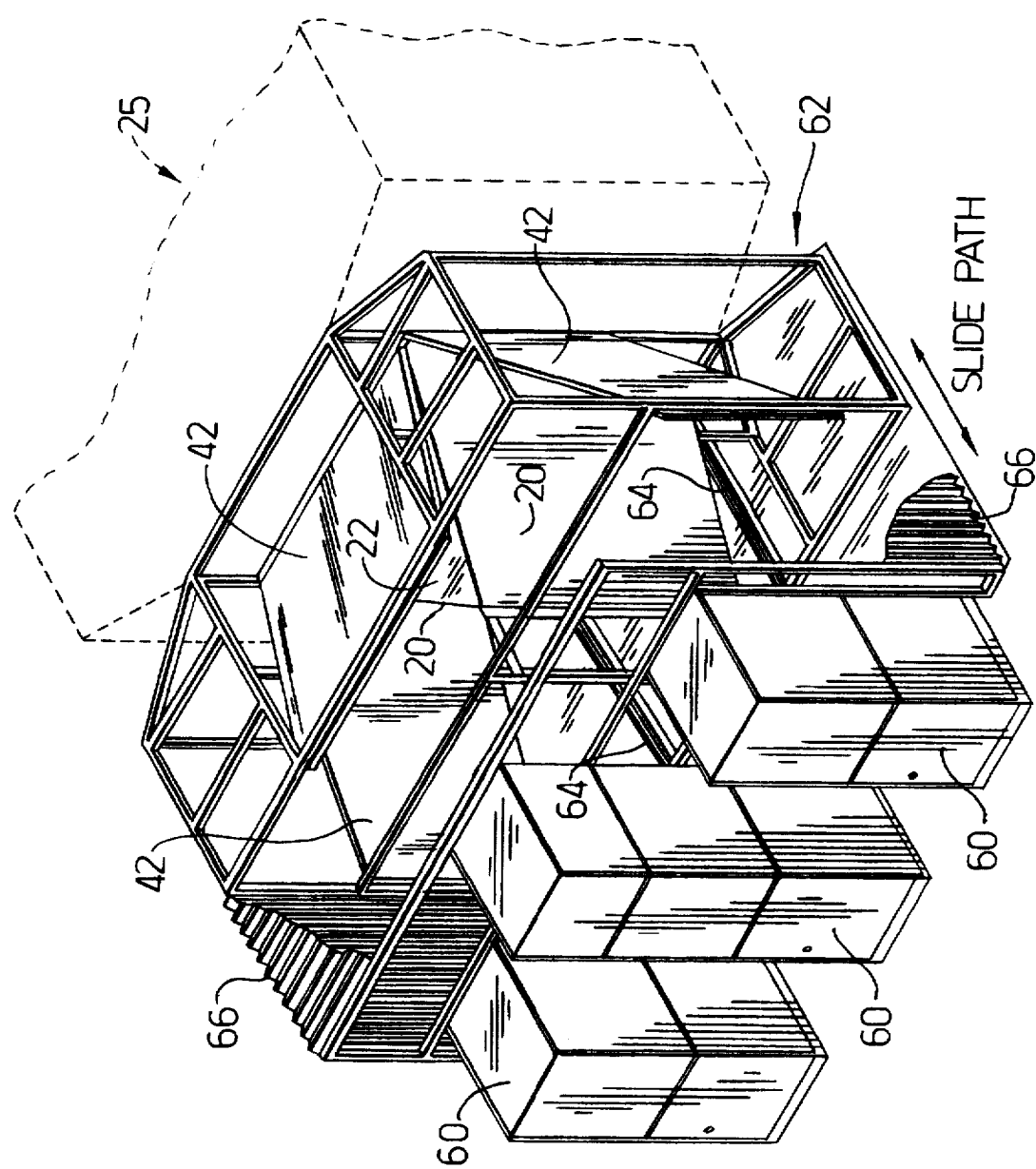
FIG. 6 is a perspective view of the rear display module and the associated cabinets of the visual display system present invention with the opaque covering partially removed for illustrative purposes.
Figure 7:
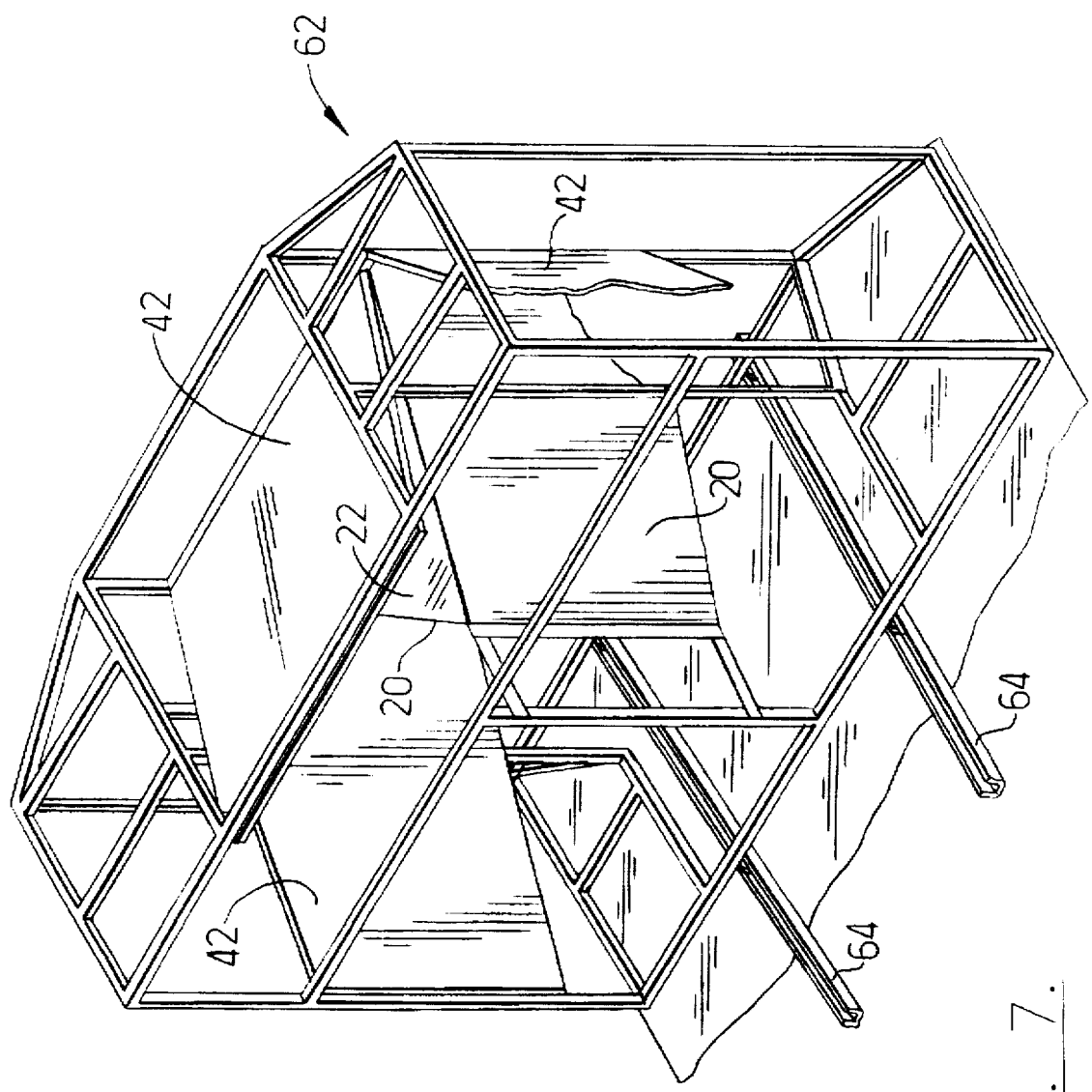
FIG. 7 is a perspective view of the rear display module illustrating the first and second rear side screens and the rear upper screen and the associated fold mirrors in more detail.
Figure 8:
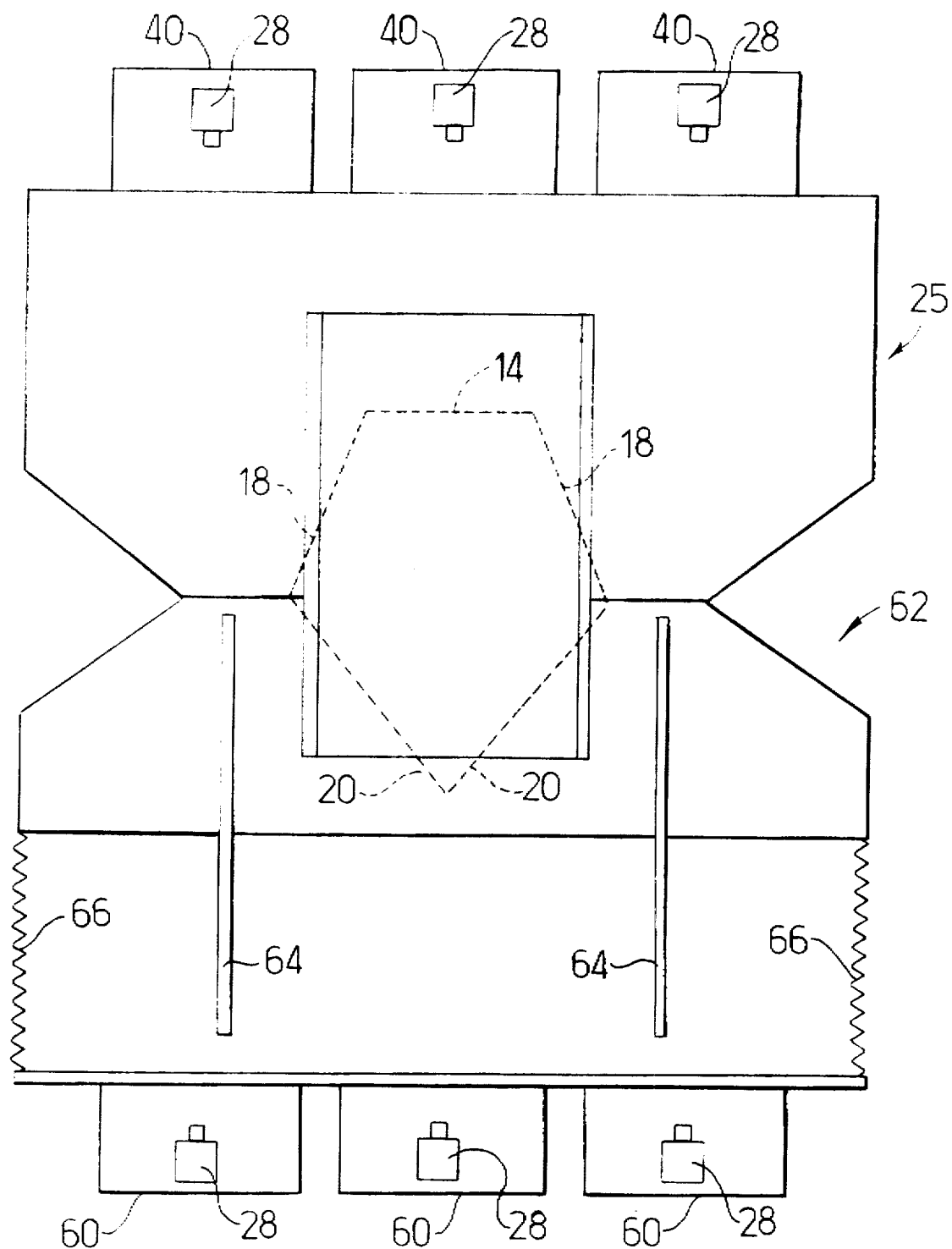
FIG. 8 is a top view of the visual display system of the present invention illustrating the forward position of the rear display module.

Further, the flight simulation system can include first and second opposed rear side screens 20 and a rear upper screen 22 as illustrated schematically in FIGS. 2 and 3 and in more detail in FIGS. 6–8. In particular, FIG. 2 is a schematic top view of the plurality of display screens 12 with the upper screen 16 and the rear upper screen removed. In addition, FIG. 3 is a schematic side view of the plurality of display screens with the side screens 18 and the rear side screens removed.

As shown, the first and second opposed rear side screens 20 extend from a first edge, adjacent the first or second side screen 18, to a common point behind the operator. Thus, as shown in FIG. 2, the front screen 14, first and second side screens and first and second rear side screens are pentagonal in shape. In addition, the rear upper screen 22 typically extends above the operator and is adjacent to the upper screen 16 and the first and second rear side screens. Accordingly, the operator can be, at least partially, enclosed by the plurality of display screens 12 of the flight simulation system of the present invention.

As shown in FIG. 1, the visual display system 10 can also include a control station 24. The control station generally includes a platform on which the operator is positioned, typically in a seated position. In response to the displayed video images, the operator generally actuates one or more controls provided on a control panel. These controls may include, for example, a joystick for positioning a simulated aircraft relative to the displayed background image. The controls may also provide information to the operator regarding the status of the simulated aircraft and the navigational conditions. The control station in combination with the front screen 14, upper screen 16 and first and second side screens 18 generally define a front display module 25.

The image displayed on the plurality of display screens 12 is generally generated by an image generation system 26. As known to those skilled in the art, the image generation system generates video signals representative of the three-dimensional video images to be displayed on the display screens. In particular, the image generation system is generally adapted to provide frames of video signals representative of the three-dimension video images at a predetermined frequency or frame rate, such as 60 hertz. Conventional image generation systems are known to those skilled in the art and are described in a book entitled "Fundamentals of Interactive Computer Graphics" by Foley et al. which was published by Addison-Wesley Publishing Company in 1982.

Figure 4:
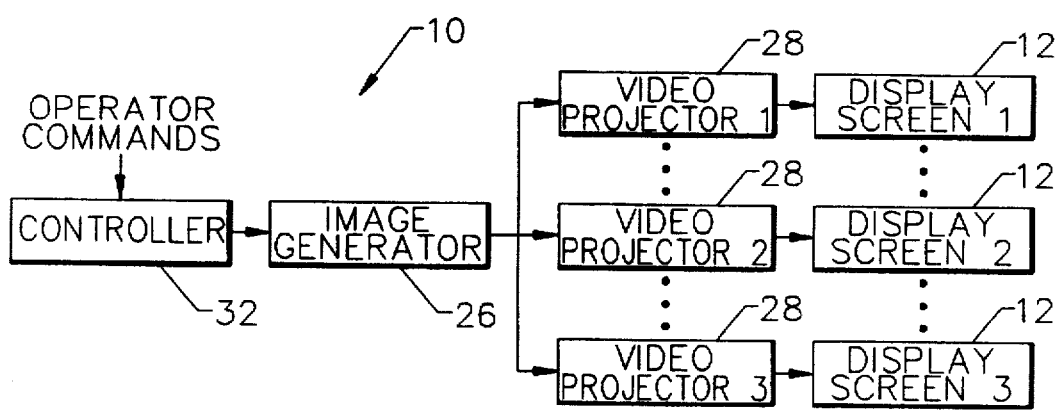
FIG. 4 is a block diagram of several components of a visual display system of the present invention include the image generation system and the video projection means.

As illustrated in block diagram form in FIG. 4, the image generation system 26 drives the video projection means 28 of the visual display system. The video projection means projects a three-dimension video image on the plurality of display screens 12 based upon the video signals provided by the image generation system.

In addition, although not described in detail herein, the visual display system 10 can include inset image generation means and inset image projection means as described in U.S. patent application Ser. No. 08/331,418, now U.S. Pat. No. 5,487,665, the contents of which are incorporated by reference herein The inset image generation means and the inset image projection means provide a plurality of inset images of relatively high resolution within the background image provided by the image generation system 26 and the video projection means 28.

The video projection means 28 preferably includes a plurality of video image projectors, at least one of which is associated with each display screen 12. Typically, the video projectors are either cathode ray tubes or light valve projectors. For full color background images, the video projectors are generally RGB projectors, such as BARCO 1208 projectors or Ampro 3300 projectors, which project a video image having red, green and blue color components. However, a monochrome video projector which produces a monochromatic video image can also be employed without departing from the spirit and sign of the present invention.

As also known to those skilled in the art, each video projector 28 includes a predetermined number of video lines, each of which is comprised of a predetermined number of picture elements or pixels. In order to display a relatively large video image for the operator, the individual pixels are projected, and thereby expanded, to fill the associated display screen 12. For example, each pair of video lines typically defines a projection angle of 12 to 18 arcminutes. Accordingly, the expanding video image projected by each video projector defines a respective video image envelope 30 in which the video signals expand as shown schematically in FIG. 9.

The visual display system 10 also includes a video display controller 32 or flight simulation controller for controlling the video image projected by the plurality of video projectors 28. In particular, the flight simulation controller controls the projected video images in response to the control signals provided by the operator. Accordingly, the operator can adjust the direction or orientation of the simulated aircraft which, in turn, dictates the video images to be projected by the plurality of video projectors and displayed upon the plurality of associated display screens 12.

As illustrated schematically in FIGS. 2 and 3, the plurality of display screens 12 of one embodiment of the visual display system 10 are circumscribed by an imaginary sphere 34 illustrated in dotted lines and having a predetermined radius R. For example, in one embodiment, the predetermined radius is about 28 inches. The imaginary sphere is centered about the design eye 36 of the flight simulation system. The design eye is generally positioned in a predetermined fixed relation to the viewing position of the operator. In particular, the design eye is generally located to coincide with the head of the operator as shown in FIG. 1.

By positioning the plurality of the display screens 12 so as to be circumscribed by the imaginary sphere 34 centered about the design eye 36 of the visual display system 10, the distortion of the displayed video image is reduced. Consequently, visual display system of the present invention need not provide distortion correction as provided in at least some conventional visual display systems. Thus, the image generation and display process is simplified in comparison with these conventional visual display systems.

As illustrated in FIG. 1, each of the display screens 12 is preferably flat so as to define a planer front and rear surface. As described hereinbelow, the generally flat display screens aides in the modularity of the flight simulation system. As also illustrated, each display screen generally has a plurality of corners, each of which intersects the imaginary sphere 34 which circumscribes the display screens.

In one embodiment, the front screen is generally rectangular while the first and second opposed side screens 18 and the upper screen 16 are trapezoidal in shape. Each side screen generally has a first edge 18a adjacent the front screen and a second edge 18b, opposite the first edge. As illustrated in FIG. 1, the height of each side screen preferably increases in an outward direction from the front screen. Thus, the second edge of each side screen is longer than the first edge. Consequently, the video signals generated by the image generation means 26 which are to be displayed on the first and second side screens preferably represent a video image which also has a trapezoidal shape corresponding to the trapezoidal shape of the first and second side screens.

More specifically, the video signals generated by the image generation means, which represent video images to be displayed on the first and second side screens, are generally blanked in the upper and lower corners adjacent the first edge due to the trapezoidal shape of the side screen.

In addition, the front screen 14 preferably has a first predetermined aspect ratio. As known to those skilled in the art, the aspect ratio defines a ratio of the width of a displayed video image to the height of the displayed video image. Each side screen 18 also preferably has a second predetermined aspect ratio. In one embodiment, the first predetermined aspect ratio of the front screen is greater than one. Thus, the width of the displayed video image is greater than the height of the displayed video image. Typically, the first predetermined aspect ratio is 4:3. In this embodiment, the second predetermined aspect ratio of each side screen is preferably less than 1. Thus, the width of the displayed video image on each side screen is less than the height of the displayed video image. For example, the second predetermined aspect ratio can 3:4. Thus, the first predetermined aspect ratio can be the inverse of the second predetermined aspect ratio.

The aspect ratio is determined, at least in part, by the video projector 28 which projects the video image to be displayed on the respective display screen 12. Therefore, in one embodiment, the video projector which is associated with the front screen 14 has a predetermined aspect ratio of 4:3 while the video projector which is associated with each respective side screen 18 has a predetermined aspect ratio of 3:4. By rotating the same type of video projector by 90°, the same type of video projector which projects the video images on the front screen can be employed to project the video images on the side screens since the rotation of the video projector inverts the aspect ratio.

Figure 5:
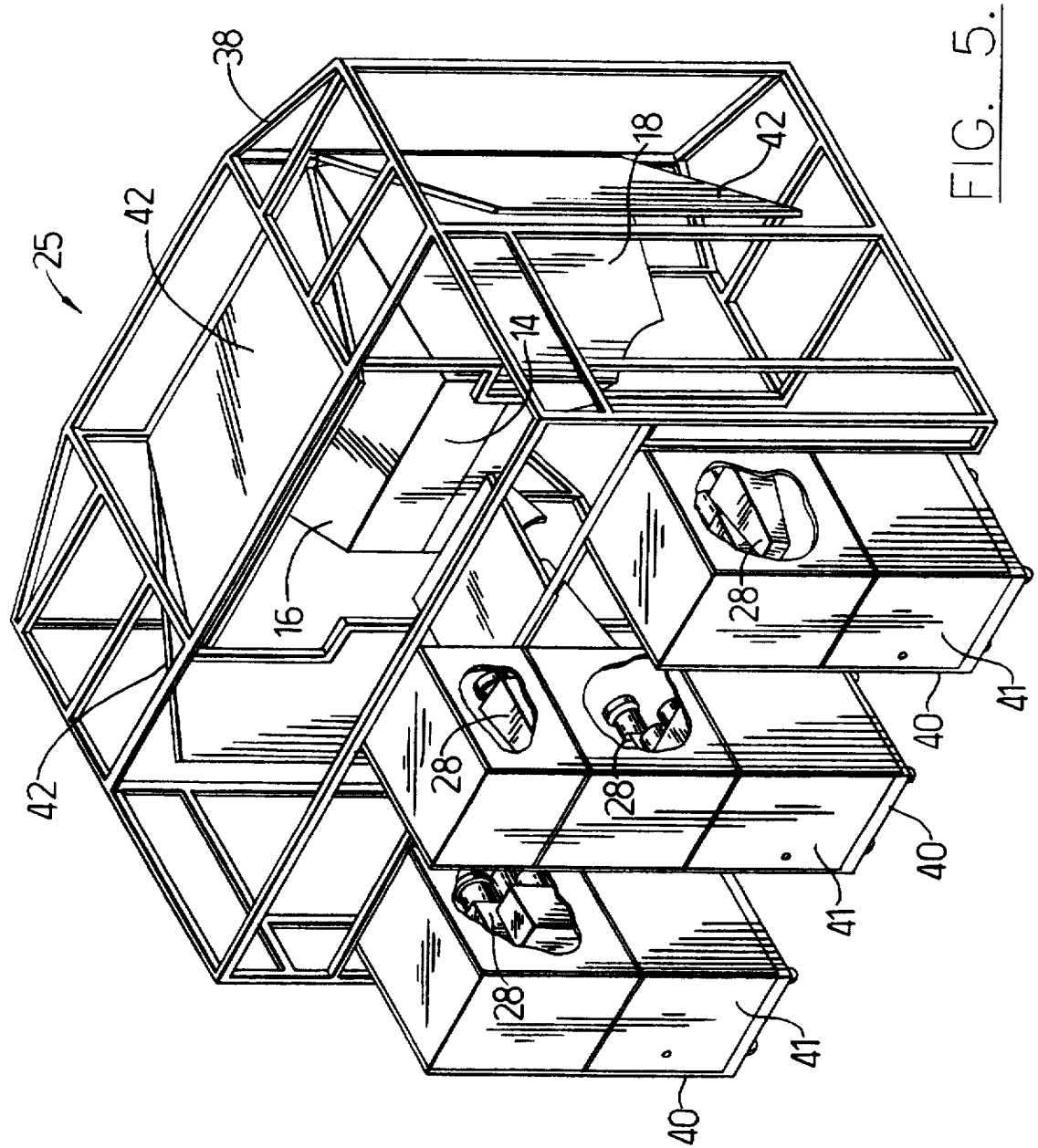
FIG. 5 is a perspective view of the visual display system support structure illustrating the predetermined positions in which the display screens, video projectors and fold mirrors are mounted.

The visual display system 10 of the present invention also generally includes a visual display system support structure 38 as illustrated in FIG. 5. Each display screen 12 and each video projector 28 is preferably mounted on the visual display system support structure in a predetermined position. In particular, the predetermined mounting positions of the plurality of video projectors which are associated with the front screen 14 and the first and second side screens 18 are preferably arranged in a linear side-by-side relationship on a rear side of the plurality of display screens, opposite the front side which the operator views. By positioning the plurality of video projectors in a linear side-by-side relationship, the overall size of the visual display system can be reduced, thereby producing a compact visual display system.

In particular, the plurality of video projectors 28, such as a plurality AMPRO 3300 video projectors, can be mounted in cabinets 40 positioned on the rear side of the plurality of display screens 12. In addition, the electronics associated with each video projector, such as the electronics which provide the drive signals to the respective cathode ray tubes (CRTs) of the plurality of video projectors, can also be mounted in the respective cabinet along with the video projector. For example, the associated electronics can be mounted in one or more drawers that are adapted to be slidably opened so as to facilitate repairs and maintenance of the visual display system. Further, the cabinets can include doors 41 positioned on the rear side of the plurality of display screens which open rearwardly such that a technician can readily access the video projectors and the associated electronics.

In order to properly display the projected video images on the associated display screens 12, the visual display system 10 of this embodiment preferably includes image redirection means, responsive to the plurality of video projectors, for redirecting the video image projected by at least two of the video projectors 28. Thus, the predetermined images projected by the plurality of video projectors are provided to the respective display screens in a direction perpendicular to the planer surface of each respective display screen.

In one embodiment, the image redirection means includes a plurality of fold mirrors 42 for redirecting the video images projected by respective video projectors 28 for display on the associated display screens 12. Typically, the image redirection means includes first and second fold mirrors for redirecting the video images to be displayed on the first and second side screens 18, respectively.

In embodiments of the visual display system 10 which include an upper screen 16, the video projector 28 which is adapted to project predetermined video images on the upper screen can be also positioned on the rear side of the plurality of display screens 12. In particular, the video projector which projects video images on the upper screen is preferably mounted above the video projector which is adapted to project a predetermined video image on the front screen 14. In this embodiment, an additional fold mirror 42 can be employed to redirect the video image projected by the video projector associated with the upper screen so that the video images are provided in a direction perpendicular to the planer surface of the upper display screen.

As shown in FIGS. 6-8, in embodiments which include first and second rear side screens 20 and a rear upper screen 22, the rear video projectors 28 and the associated electronics which are associated with each of these additional display screens can be mounted in respective cabinets 60 on the rear side of these display screens. The cabinets in which these video projectors are disposed are typically located on the opposite side of the visual display system support structure 38 from the cabinets 40 housing the video projectors that are associated with the front screen 14, the upper screen 16 and the first and second opposed side screens 18. In addition, a plurality of fold mirrors 42 can be employed with the video projectors associated with the first and second rear side screens and the rear upper screen in order to provide the predetermined video images to the respective display screens in a direction perpendicular to the planar surface of each display screen.

As illustrated in FIGS. 6 and 8, the cabinets 60 and the rear video projectors 28 and associated electronics disposed therein are generally located in a fixed position. In contrast, the rear display module 62 which includes the first and second rear side screens 20 and the rear upper screen 22 can be mounted on a platform which is adapted to move in a forwardly and rearwardly direction. The rear display module is preferably mounted upon a pair of rails 64, such as Thompson rails, which allow the rear display module to slide from a rear position to a forward position as shown in FIG. 8.

Typically, the operator enters the visual display system 10 when the rear display module 62 is in the rear position. Thereafter, the rear display module can be moved to the forward position such that the operator is enclosed within a cavity defined between the front and rear display modules. Following the simulation, the rear display module can again be moved to the rear position such that the operator can exit the visual display system. While a slidable rear display module is illustrated in FIGS. 6-8 and is described in detail herein, the rear display module can be fixed in position and other methods of entering and exiting the visual display system can be employed without departing from the spirit and scope of the present invention.

As described above and shown in FIGS. 6 and 8, the cabinets 60 associated with the rear display module 62 are generally positioned in a fixed location while the rear display module slides from the rear position adjacent the cabinets to the forward position adjacent the front display module 25. An opaque collapsible covering 66, typically formed of a blackout fabric such as vinyl backed with cloth, preferably extends between the cabinets and the rear display module such that the images projected by the plurality of associated video projectors 28 are clearly and distinctly displayed on the first and second rear side screens 20 and the rear upper screen 22. As shown, the opaque covering advantageously collapses, such as in an accordion fashion, as the rear display module is moved to the rear position and stretches or extends as the rear display module is moved to the forward position.

As illustrated, the rear display module 62 preferably abuts the front display module 25 in an aligned relationship in the forward position. In particular, the front and rear display modules generally include a plurality of alignment pins and corresponding apertures mate to insure that the modules are aligned. In addition, the front and rear display modules preferably abut snugly such that little, if any, light enters enclosed area in which the operator is seated.

Figure 9:
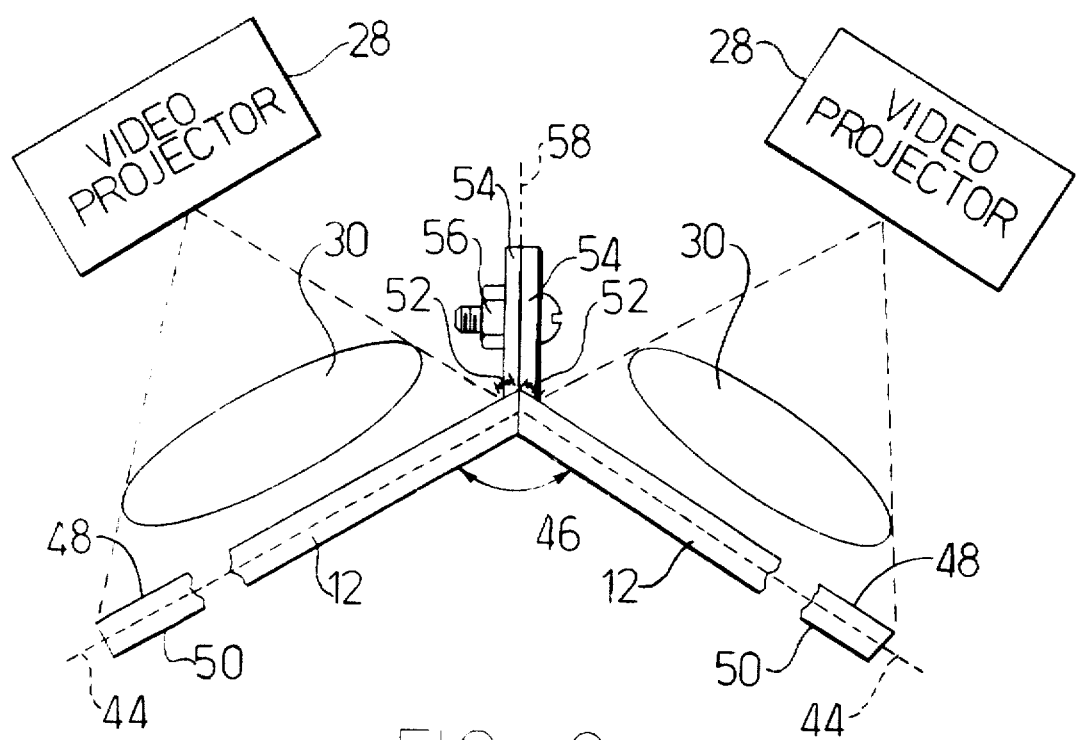
FIG. 9 is a schematic top view of a pair of adjacent display screens and the respective first and second tabs.

As illustrated in more detail in FIG. 9, each display screen 12 generally includes a planar display surface 44 on which the projected images are displayed. Typically, the dimensions of the display surface are defined by the dimensions of the front surface 50 of the respective display screen and, in most embodiments, the display surface is the front surface of the respective display screen. As shown, adjacent display screens are generally mounted in an abutting relationship along respective edges. Thus, the respective display surfaces of the abutting display screens preferably intersect at a predetermined angle 46. Accordingly, the front side of the abutting display screens generally define a concave shape.

Consequently, the rear surface 48 of each display screen 12 is preferably wider than the corresponding front surface 50, and the corresponding display surface, so as to define a rear edge portion 52 which extends along each edge of the display screens and which extends outwardly beyond the corresponding front surface as shown in FIG. 9. First and second tabs 54 can be bonded to the respective rear edge portions of adjacent display screens. Each tab extends rearwardly from the rear side of the respective display screen such that the video images which are projected by the video projectors 28 on the display surface of the display screens are not masked by the rearwardly extending tabs. In particular, the first and second rearwardly extending tabs are preferably outside of the video image envelope 30 defined by the expanding video images projected by each video projector such that the video images are not masked.

In one embodiment, the first and second tabs 54 preferably extend rearwardly from the rear side to the respective display screens 12 to thereby define an edge plane 58 in which the tabs extend. The edge plane defined by the pair of tabs advantageously bisects the predetermined angle 46 defined by the intersection of the first and second display screens. Thus, the first and second tabs are outside of the video image envelope 30 defined by the expanding video images.

At least one of each pair of tabs 54 is preferably opaque, typically comprised of an opaque acrylic material. However, the tabs can be comprised of other materials without departing from the spirit and scope of the present invention. Thus, the projected video images will not pass between the adjacent display screens 12. In particular, the video image that is projected on a first display screen will not pass through the abutting edge portions of the display screens so as to be displayed or so as to interfere with the display on a second adjacent display screen. Accordingly, at least the portion of the video image displayed along the edges of the abutting display screens is clarified.

As illustrated in FIG. 9, the first and second tabs 54 are attached, such as by attachment means so that the first and second abutting display screens are securely joined. As shown, the attachment means can include a threaded connector 56. However, other types of connectors can be employed without departing from the spirit and scope of the present invention.

Each tab 54 generally includes an elongated strip which extends along the edge of a respective display screen 12. In addition, each tab is generally bonded to the rear edge portion 52 of a respective display screen with an optically transmissive adhesive, such as a clear acrylic cement.

The visual display system 10 of the present invention is generally modular. In particular, the visual display system includes a plurality of generally flat display screens 12 which are attached along abutting edges, such as with threaded connectors 56, such that the plurality of display screens can be readily assembled and disassembled. In addition, the plurality of video projectors 28 are linked to a common image generation system 26 and are mounted, along with their associated electronics, in an aligned row of cabinets 40 to further facilitate the assembly and disassembly of the visual display system. Accordingly, the visual display system of the present invention can be readily disassembled, transported to a new location, such as near a training center in the field, and reassembled.

In addition, the image generation system 26, the plurality of video projectors 28 and their associated electronics and the control system, including the visual display controller 32, have been designed to function on standard power levels, such as 110 VAC. In addition, the overall size and complexity of the visual display system is reduced by employing a plurality of generally flat display screens 12 and a plurality of associated video projectors 28, each of which are housed in a respective cabinet 40 along with its associated electronics. Thus, the visual display system 10 of the present invention is designed to be assembled within a room of standard dimensions which has, for example, an 8 foot ceiling.

Therefore, according to the visual display system of the present invention, the plurality of display screens 12 can be positioned so as to be circumscribed by an imaginary sphere 34, thereby reducing the distortion of the displayed video image. In addition, the plurality of video projectors 28 which provide the video images for display on the display surfaces of the display screens can be arranged in a predetermined relationship on the rear side of the display screens, such as in a linear side-by-side relationship, so as to reduce the overall size of the visual display system 10 and to increase the modularity of the visual display system. In addition, tabs 54 can extend rearwardly from the edges of adjacent display screens so as to securely join adjacent display screens without masking the projected video image. The tabs also clarify the displayed video image, at least along the edges of the adjacent display screens, by preventing the projected video images from passing between the adjacent displays.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A flight simulation system comprising:
   video projection means for projecting a predetermined video image;
   a plurality of display screens, responsive to said video projection means, for displaying the predetermined video image projected by said video projection means, said plurality of display screens comprising a front screen, first and second opposed side screens and an upper screen, wherein each of said first and second opposed side screens has a trapezoidal shape such that each side screen has a first edge adjacent said front screen and a second edge, opposite the first edge, and wherein the height of each side screen increases in an outward direction from the front screen such that the second edge of each side screen is longer than the first edge;
   a control station for providing control signals in response to actuation by an operator of the flight simulation system based upon the predetermined video image displayed on said plurality of display screens, wherein the operator is positioned in a predetermined viewing position; and
   a flight simulation controller for controlling the video image projected by said video projection means in response to the control signals provided by the operator,
   wherein each of said plurality of display screens is circumscribed by an imaginary sphere having a predetermined radius and centered about a design eye of the flight simulation system, and wherein the design eye is positioned in a predetermined fixed relation to the viewing position of the operator such that distortion of the displayed video image is thereby reduced.

2. A flight simulation system according to claim 1 wherein each of said plurality of display screens includes a planar surface having a plurality of corners, and wherein said plurality of corners of each of said planar display screens intersects the imaginary sphere which circumscribes said plurality of display screens.

3. A flight simulation system according to claim 1 further comprising image generation means for generating video signals representative of the predetermined video images wherein the video signals generated by said image generation means which are representative of video images to be displayed on said first and second side screens represent a video image having a trapezoidal shape corresponding to the trapezoidal shape of said first and second side screens.

4. A flight simulation system according to claim 1 wherein said plurality of display screens further comprises first and second rear side screens and a rear upper screen, said first and second rear side screens and said rear upper screen also being circumscribed by the imaginary sphere centered about the design eye of the flight simulation system.

5. A flight simulation system comprising:
   video projection means for projecting a predetermined video image;
   a plurality of display screens, responsive to said video projection means, for displaying the predetermined video image projected by said video projection means, said plurality of display screens comprising a front screen, first and second opposed side screens and an upper screen, wherein said front screen has a first predetermined aspect ratio of greater than one such that the width of the video image displayed on said front screen is greater than the height of the video image displayed on the front screen, and wherein each side screen has a second predetermined aspect ratio of less than one such that the width of the video image displayed on the respective side screen is less than the height of the video image displayed on the respective side screen;

a control station for providing control signals in response to actuation by an operator of the flight simulation system based upon the predetermined video image displayed on said plurality of display screens, wherein the operator is positioned in a predetermined viewing position; and a flight simulation controller for controlling the video image projected by said video projection means in response to the control signals provided by the operator, wherein each of said plurality of display screens is circumscribed by an imaginary sphere having a predetermined radius and centered about a design eye of the flight simulation system, and wherein the design eye is positioned in a predetermined fixed relation to the viewing position of the operator such that distortion of the displayed video image is thereby reduced.

6. A flight simulation system according to claim 5 wherein the first predetermined aspect ratio is the inverse of the second predetermined aspect ratio.

* * * * *